(12) United States Patent
Jakubik et al.

(10) Patent No.: US 9,253,146 B2
(45) Date of Patent: Feb. 2, 2016

(54) PREVENTING DUPLICATE SOURCES FROM CLIENTS SERVED BY A NETWORK ADDRESS PORT TRANSLATOR

(71) Applicant: International Business Machines Corporation, Armonk, NY (US)

(72) Inventors: Patricia A. Jakubik, Raleigh, NC (US); Linwood Hugh Overby, Jr., Raleigh, NC (US); Joyce Anne Porter, Apex, NC (US); David John Wierbowski, Owego, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 60 days.

(21) Appl. No.: 14/270,810

(22) Filed: May 6, 2014

(65) Prior Publication Data
US 2014/0244862 A1    Aug. 28, 2014

Related U.S. Application Data

(63) Continuation of application No. 10/907,659, filed on Apr. 11, 2005, now Pat. No. 8,787,393.

(51) Int. Cl.
*H04L 29/12* (2006.01)
*H04L 29/06* (2006.01)

(52) U.S. Cl.
CPC ...... *H04L 61/2046* (2013.01); *H04L 29/12009* (2013.01); *H04L 29/12377* (2013.01); *H04L 29/12924* (2013.01); *H04L 61/2517* (2013.01); *H04L 61/6063* (2013.01); *H04L 63/0428* (2013.01); *H04L 63/164* (2013.01)

(58) Field of Classification Search
None
See application file for complete search history.

(56) References Cited

U.S. PATENT DOCUMENTS

| 5,758,084 | A | | 5/1998 | Silverstein et al. |
|---|---|---|---|---|
| 6,138,144 | A | * | 10/2000 | DeSimone ............ H04L 12/18 709/204 |
| 6,404,736 | B1 | | 6/2002 | Arkko et al. |
| 6,539,025 | B1 | | 3/2003 | Manning et al. |
| 6,615,357 | B1 | | 9/2003 | Boden et al. |
| 7,477,640 | B2 | | 1/2009 | Oguchi et al. |

(Continued)

FOREIGN PATENT DOCUMENTS

| WO | 2006/108805 A1 | 10/2006 |
|---|---|---|
| WO | 2006/108808 A1 | 10/2006 |

OTHER PUBLICATIONS

Patricia A. Jakubik et al., U.S. Appl. No. 10/907,661, filed Apr. 11, 2005, Office Action, Oct. 31, 2007, 13 pages.

(Continued)

*Primary Examiner* — Chirag Shah
*Assistant Examiner* — Joshua Smith
(74) *Attorney, Agent, or Firm* — Marcia L. Doubet

(57) ABSTRACT

Preventing duplicate sources in a network that uses network address port translation on an established connection. In response to receiving an inbound packet at a destination host, input values are obtained therefrom and used to consult a mapping. If no match is found, a translation is performed, whereby a determination is made as to whether or not a port number is available within a range of port numbers that comply with a security association governing the connection. If so, an available port number is assigned to the connection, thereby avoiding a possibility of a duplicate source. If a port number is not available, the packet is rejected.

15 Claims, 7 Drawing Sheets

(56) References Cited

U.S. PATENT DOCUMENTS

| | | | |
|---|---|---|---|
| 7,656,795 | B2 | 2/2010 | Jakubik et al. |
| 7,924,449 | B2* | 4/2011 | Maki .................... G06Q 10/10 709/220 |
| 2002/0012328 | A1 | 1/2002 | Emanuel et al. |
| 2002/0114333 | A1 | 8/2002 | Xu et al. |
| 2002/0144024 | A1* | 10/2002 | Kumpf .................. G06F 13/102 709/203 |
| 2002/0178268 | A1* | 11/2002 | Aiken, Jr. ............... H04L 29/06 709/228 |
| 2003/0026258 | A1* | 2/2003 | Takatani ................. H04L 29/06 370/392 |
| 2003/0043740 | A1 | 3/2003 | March et al. |
| 2003/0086388 | A1* | 5/2003 | Peters .................. G06F 13/387 370/328 |
| 2003/0093558 | A1 | 5/2003 | Crump |
| 2003/0115327 | A1* | 6/2003 | Kokado ............. H04L 63/0209 709/225 |
| 2003/0140089 | A1 | 7/2003 | Hines et al. |
| 2003/0154306 | A1 | 8/2003 | Perry |
| 2003/0233452 | A1 | 12/2003 | Maufer et al. |
| 2003/0235153 | A1* | 12/2003 | Lee ................... H04Q 11/0062 370/229 |
| 2004/0071149 | A1 | 4/2004 | Kim et al. |
| 2004/0088537 | A1 | 5/2004 | Swander et al. |
| 2004/0143758 | A1 | 7/2004 | Swander et al. |
| 2004/0193677 | A1 | 9/2004 | Dar et al. |
| 2004/0218614 | A1* | 11/2004 | Yokomitsu ........ H04L 29/12009 370/401 |
| 2005/0018651 | A1 | 1/2005 | Yan et al. |
| 2005/0041596 | A1* | 2/2005 | Yokomitsu ........ H04L 29/12283 370/252 |
| 2005/0044227 | A1* | 2/2005 | Haugh .................... H04L 29/06 709/226 |
| 2005/0074017 | A1 | 4/2005 | Qian et al. |
| 2005/0166206 | A1 | 7/2005 | Parson |
| 2005/0265252 | A1 | 12/2005 | Banerjee et al. |
| 2006/0034297 | A1 | 2/2006 | O'Neil |
| 2006/0227807 | A1 | 10/2006 | Jakubik et al. |

OTHER PUBLICATIONS

Patricia A. Jakubik et al., U.S. Appl. No. 10/907,661, filed Apr. 11, 2005, Office Action, Apr. 18, 2008, 13 pages.

Patricia A. Jakubik et al., U.S. Appl. No. 10/907,661, filed Apr. 11, 2005, Office Action, Sep. 8, 2008, 14 pages.

Patricia A. Jakubik et al., U.S. Appl. No. 10/907,661, filed Apr. 11, 2005, Office Action, Mar. 2, 2009, 12 pages.

Montenegro, G., et al., "RSIP Support for End-to-end IPsec; rfc3104. txt", IETF Standard, Internet Engineering Task Force, IETF, CH, Oct. 2001, XP01508885 ISSN: 0000-0003, p. 13, line 1-last line. 18 pages.

Zaccone, C., et al., "Address reuse in the Internet, adjourning or suspending the adoption of IP next generation?", Proceedings IEEE International Conference on Networks 2000 (ICON 2000), Networking Trends and Challenges in the New Millennium. Singapore, Sep. 5-8, 2000, XP010514142 ISBN: 0-7695-0777-8. pp. 462-468.

Patricia A. Jakubik et al., U.S. Appl. No. 10/907,659, filed Apr. 11, 2005, Office Action, Feb. 1, 2008, 30 pages.

Patricia A. Jakubik et al., U.S. Appl. No. 10/907,659, filed Apr. 11, 2005, Office Action, Jul. 28, 2008, 35 pages.

Patricia A. Jakubik et al., U.S. Appl. No. 10/907,659, filed Apr. 11, 2005, Office Action, May 14, 2009, 42 pages.

Patricia A. Jakubik et al., U.S. Appl. No. 10/907,659, filed Apr. 11, 2005, Office Action, Oct. 29, 2009, 44 pages.

Sternberg, M., et al. "IPsec NAT-Traversal draft-stenberg-ipsec-nat-traversal-02.txt", IETF Working Draft, Internet Engineering Task Force, IETF, CH, No. 2, Feb. 28, 2001. 21 pages.

Pouseele, S., "How to Pass IPSec traffic through ISA Server", published on the Internet at http://www.isaserver.org/articles-tutorials/articles/IPSec_Passthrough.html, Apr. 11, 2003; last updated May 20, 2013; retrieved on Jun. 28, 2014. 9 pages.

Aboba, B., et al., "IPsec-Network Address Translation (NAT) Compatibility Requirements", IETF Request for Comments 3715, Mar. 2004. 18 pages.

Patel, B., et al., "Dynamic Host Configuration Protocol (DHCPv4) Configuration of IPsec Tunnel Mode", IETF Request for Comments 3456, Jan. 2003. 18 pages.

Huttunen, A., et al., "UDP Encapsulation of IPsec ESP Packets", IETF Request for Comments 3948, Jan. 2005. 18 pages.

Kivinen, T., et al., "Negotiation of NAT-Traversal in the IKE", IETF Request for Comments 3947, Jan. 2005. 16 pages.

Postel, J., "User Datagram Protocol", IETF Request for Comments 768, Aug. 28, 1980. 3 pages.

Srisuresh, P., et al., "Traditional IP Network Address Translator (Traditional NAT)", IETF Request for Comments 3022, Jan. 2001. 16 pages.

Kent, S., et al., "Security Architecture for the Internet Protocol", IETF Request for Comments 2401, Nov. 1998. 66 pages.

Kent, S., et al., "IP Encapsulating Security Payload (ESP)", IETF Request for Comments 2406, Nov. 1998. 22 pages.

* cited by examiner

FIG. 4 - NAPT ENCAPSULATED PACKET FROM CLIENT ADDR 10.1.1.1 PORT 4096

| 400 IP HEADER SRC 210.1.1.1 DEST 11.1.1.1 | 402 UDP HEADER SRC PORT 4501 DEST PORT 4500 | 404 ESP HEADER | 406 PROTOCOL TCP SRC PORT 4096 DEST PORT 21 | 408 PAYLOAD | 410 ESP TRAILER |

FIG. 5 - PACKET FROM FIG. 4 AFTER IPSEC PROCESSING AT HOST

| 500 IP HEADER SRC 210.1.1.1 DEST 11.1.1.1 | 506 PROTOCOL TCP SRC PORT 4096 DEST PORT 21 | 508 PAYLOAD |

FIG. 6 - NAPT ENCAPSULATED PACKET FROM CLIENT ADDR 10.1.1.2 PORT 4096

| 600 IP HEADER SRC 210.1.1.1 DEST 11.1.1.1 | 602 UDP HEADER SRC PORT 4502 DEST PORT 4500 | 604 ESP HEADER | 606 PROTOCOL TCP SRC PORT4096 DEST PORT 21 | 608 PAYLOAD | 610 ESP TRAILER |

FIG. 7 - PACKET FROM FIG. 5 AFTER IPSEC PROCESSING AT HOST

| 700 IP HEADER SRC 210.1.1.1 DEST 11.1.1.1 | 706 PROTOCOL TCP SRC PORT 4096 DEST PORT 21 | 708 PAYLOAD |

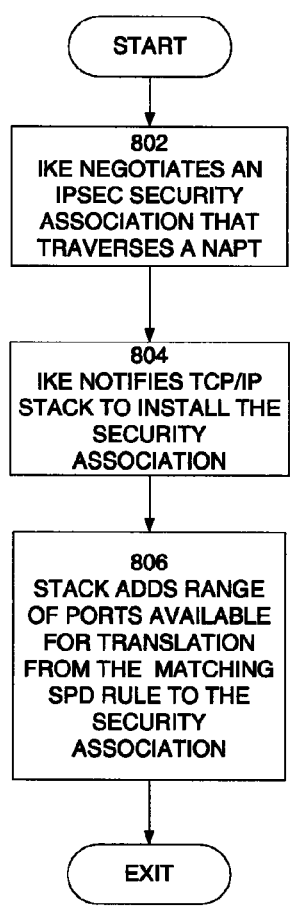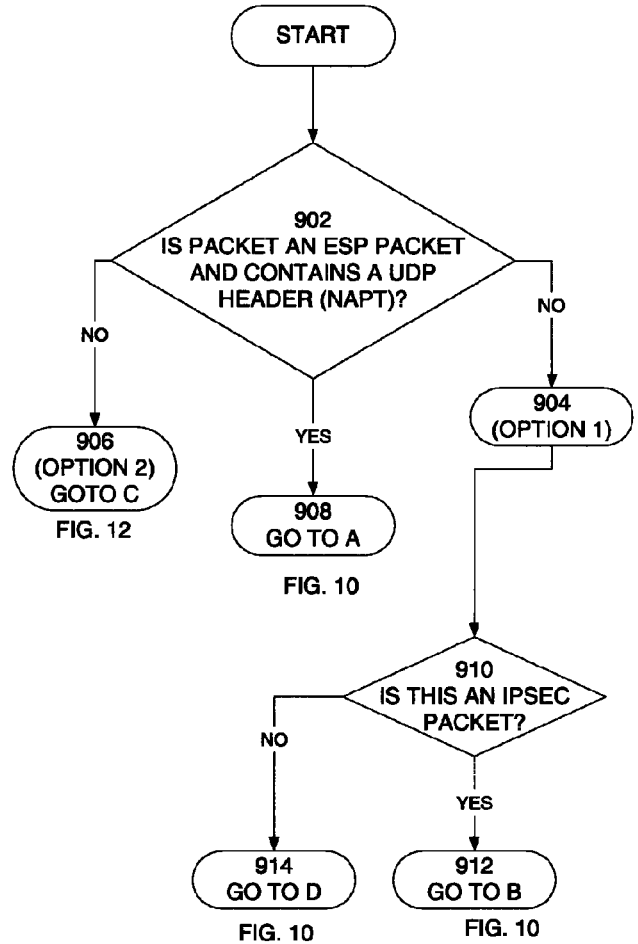

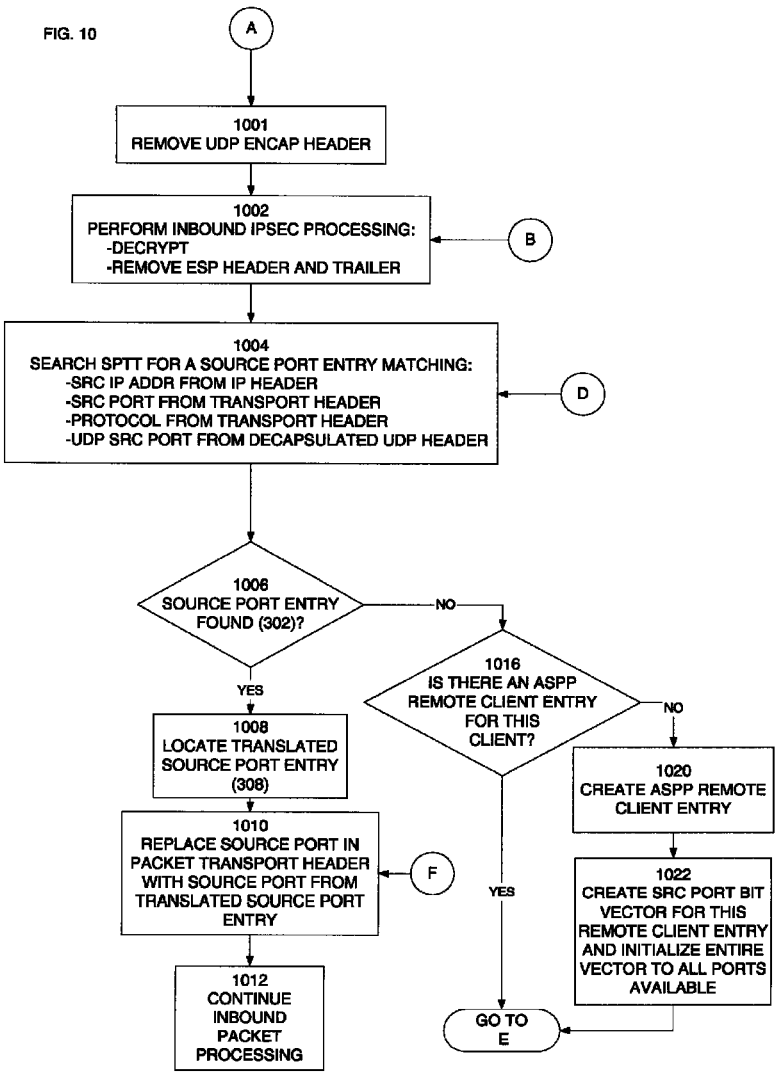

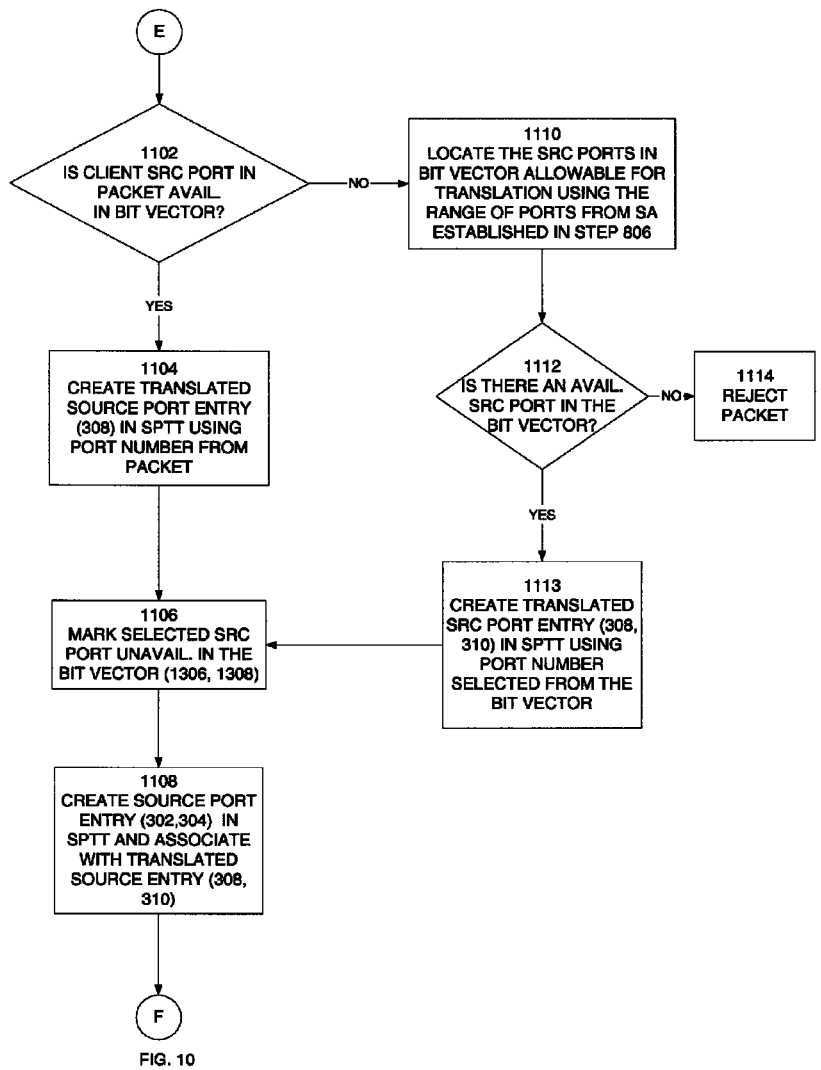

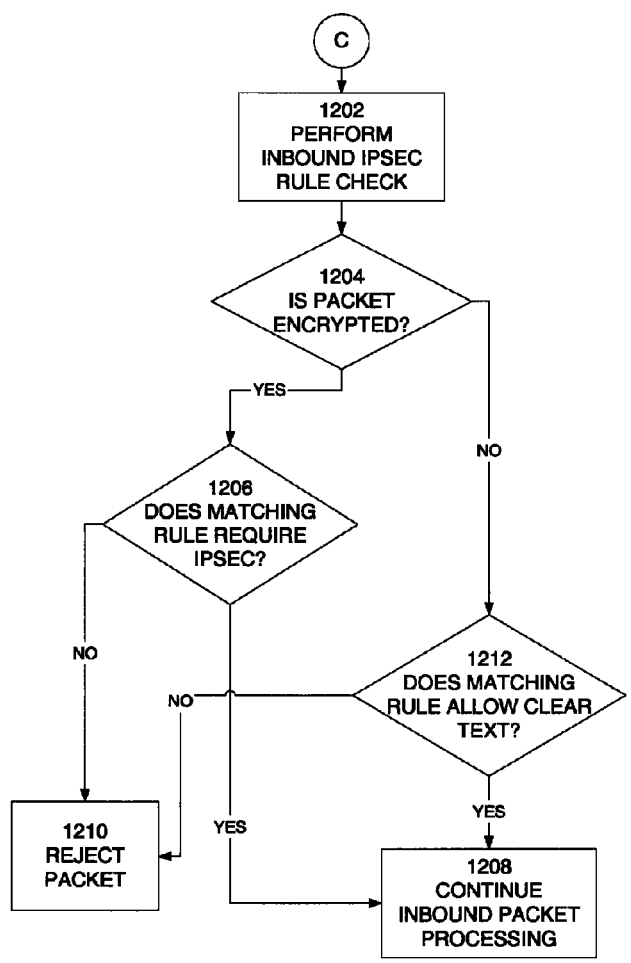

PREVENTING DUPLICATE SOURCES FROM CLIENTS SERVED BY A NETWORK ADDRESS PORT TRANSLATOR

BACKGROUND

The invention relates generally to internet networking and specifically to addressing conflicts caused by network address and port translation.

The problems and solutions addressed by the invention are described herein in terms of the Internet and the TCP/IP protocols that form the basis of Internet communications. However, the invention can apply to other communication protocols as well, depending on the specifics of the protocols.

Internet Network Address Translation is used for several reasons. The main reason is to economize on the use of public addresses. The Internet Protocol (IP) address of a Network Address Translator (NAT) is generally a public address. That is, the NAT IP address is known to the outside world, while all of the servers or clients behind the NAT are private addresses, unknown to the outside world. In such a case, the outside world communicates with the NAT and the NAT controls the communications with the appropriate servers and clients behind it. This means that the IP addresses of devices behind the NAT only have to be unique within that family, but can be duplicative of other IP addresses in the rest of the world. NATs involve only the translation of IP addresses. There is a further type of translation known as Network Address Port Translation (NAPT) in which both IP addresses and port numbers are translated. The standards for Network Address Translation (NAT) and Network Address Port Translation (NAPT) are set forth in the Internet Engineering Task Force (IETF) RFC 3022, entitled "Traditional IP Network Address Translation".

The original Internet was not designed with security as a primary factor. In fact, the Internet was purposely made relatively open as an aid to scientific and educational communication. However, the advent of the Web and its commercial uses has increased the need for secure Internet communications. The Internet Security Protocol, commonly known as IPsec, was defined to address these issues. For example, IPsec provides for the authentication of network devices and/or for the encryption of transmitted data. An IPsec communication between source and destination addresses is administered in accordance with a security association (SA); an SA is one or more rules that define the IPsec processing applied to the communication. IPsec is defined in RFC 2401 and other RFCs. Whether a packet is denied, permitted without Ipsec processing or permitted with Ipsec processing is determined by matching the attributes of a packet with the security rules in a security policy database (SPD). To make this determination the known art searches both static and dynamic rules in the order of most specific to least specific attributes for both outgoing and incoming packets. A set of static rules is essentially a security policy. Static rules are predefined and generally do not change very often. Dynamic rules are rules that are negotiated between nodes during IKE (Internet Key Exchange) processing as needed and added to the security policy database. U.S. Pat. No. 6,347,376 to International Business Machines describes a preferred method of searching the dynamic rules of an SPD. This patent is incorporated herein by reference in its entirety.

There are inherent incompatibilities between network address or port translation and IPsec processing. These incompatibilities are a barrier to deployment of IPsec. RFC 3715 recognizes and discusses some of these incompatibilities, but offers no general solutions. For example, Section 4.1 of RFC 3715 refers to a limited solution proposed in RFC 3456, "Dynamic Host Configuration Protocol (DHCPv4, Configuration of IPsec Tunnel Mode"), but states that a more general solution is needed. In addition, Section 5 of RFC 3948 entitled "*UDP Encapsulation of IPsec Packets*" from the IPsec working group of IETF also addresses some of the incompatibility problems. Particularly, Section 5.2 of RFC 3948 describes briefly a problem in determining what IPsec security associations to use on connections to clients served by a NAPT. This Section also describes another problem in allowing a clear text connection to a client behind a NAPT when the NAPT also handles IPsec traffic.

The present invention is directed to the problem of avoiding duplicate sources when clients are served by a NAPT. No solutions are provided for this problem by any of the related IETF RFCs. For purposes of this specification, duplicate sources are defined as packets having the same source addresses (e.g., an IP address of a NAPT assigned to an IPsec encapsulated original packet), the same transport protocol and the same original source port number (i.e. port number in the transport header of the IPSec encapsulated packet).

Duplicate sources results in duplicate connections that breech network integrity. For example, packets can be sent to the wrong destination.

RFC 3947, entitled "*Negotiation of NAT—Traversal in the IKE*", describes what is needed in the IKE (Internet Key Exchange) phases 1 and 2 for the NAT traversal support. This includes detecting if both ends in a packet communication support NAT traversal, and detecting if there is one or more NATs along the path from host to host. It also covers how to negotiate the use of User Datagram Protocol (UDP) encapsulated IPsec packets in the IKE Quick Mode and describes how to transmit an original source IP address to the other end if needed". The UDP is defined in RFC 768. RFC 3948, "*UDP Encapsulation of IPsec Packets*", defines methods to encapsulate and decapsulate ESP (Encapsulating Security Payload) packets inside of UDP packets for the purpose of traversing NATs. ESP is defined in RFC 2406. ESP is designed to provide a mix of security services in IPv4 and IPv6.

U.S. patent application Ser. No. 10/907,661 (now U.S. Pat. No. 7,656,795), also assigned to the same assignee as this application and filed simultaneously with this application, is also directed to solving the problem of duplicate sources caused by NAPT translation. The present application improves the performance of U.S. patent application Ser. No. 10/907,661 in that it is directed at a technique of minimizing the number of packets that are rejected as potential duplicate sources.

BRIEF SUMMARY

The invention is directed to preventing duplicate sources in networks that use network address port translation, or NAPT, on an established connection between a source host computer and a destination host computer. When a packet is received at the destination host computer, input values comprising a network source address, source port number added by the NAPT, original source port number of the source host computer, and protocol identification are obtained therefrom. A mapping of source port numbers to translated source port numbers is consulted using the input values, and if no matching entry is found, then a translation is performed. The translation determines if a port number is available within a range of port numbers that comply with a security association governing the connection. If an available port is found, it is assigned to the connection, thereby avoiding a possibility of a duplicate source. If no available port number is available within the range of port numbers governing the connection, the packet is rejected.

BRIEF DESCRIPTION OF THE SEVERAL VIEWS OF THE DRAWINGS

The invention will be better understood by reference to the drawings in which:

FIG. 4 shows a NAPT translated packet that encapsulates an encrypted original packet;

FIG. 5 shows the packet of FIG. 4 after decryption;

FIGS. 6 and 7 correspond to FIGS. 4 and 5, respectively, and show a second packet on the same path as the earlier packet that represents an illegal duplicate connection caused by the inclusion of a NAPT in the transmission path;

FIG. 8 is an illustrative flowchart of the Internet Key Exchange protocol whereby a security association is defined and a range of port numbers are determined, both for installation into a protocol stack for communications between this destination and a client;

FIG. 9 is a flowchart showing options that are available when an inbound packet first arrives at a destination host;

FIG. 10 is a flowchart showing at entry A the processing of an inbound packet that both encapsulates an encrypted original packet and has passed through an NAPT; at entry B the processing of an IPsec packet that has not passed through a NAPT, and at entry D has not passed through a NAPT and is not an IPsec packet; and FIG. 11 continues the processing of an inbound packet from FIG. 10;

FIG. 12 is a flowchart showing an alternative way of processing inbound packets that do not satisfy both conditions of encapsulation and passing through an NAPT.

DETAILED DESCRIPTION

Figure 1:
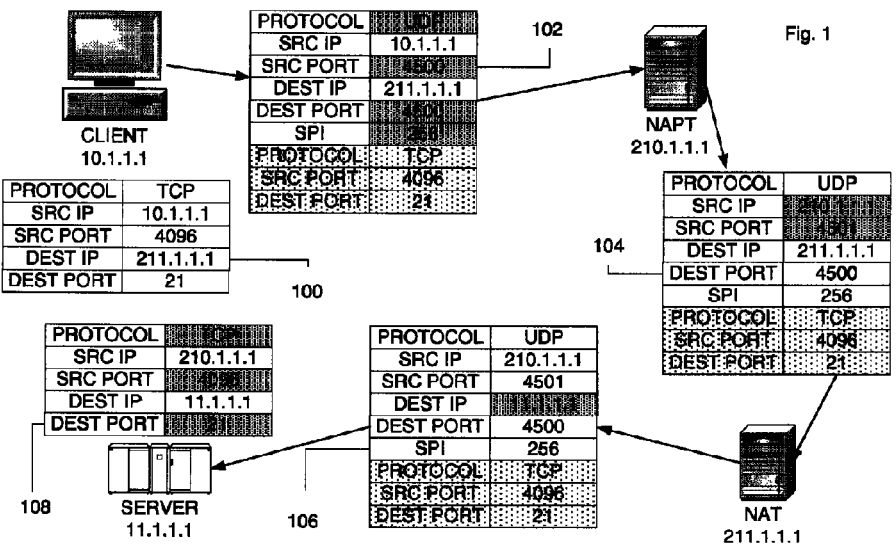
FIG. 1 shows a packet progressing from a client, through a NAPT and a NAT to a destination host and the changes to the packet headers and contents as the packet progresses.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Although the problems addressed by the invention exist for both transport mode and tunnel mode in Internet transmissions, the disclosed embodiment is directed primarily to transport mode. A small variation that is described adapts the transport mode disclosure for operation in tunnel mode.

In the preferred embodiment, the invention is implemented in software. As will be appreciated by those of skill in the art, the present invention can take the form of an entirely hardware embodiment, an entirely software (including firmware, resident software, micro-code, etc.) embodiment, or an embodiment containing both software and hardware aspects.

Furthermore, the present invention can take the form of a computer program product on a computer-usable or computer-readable storage medium having program code means embodied in the medium for use by or in connection with a computer or any instruction execution system. In the context of this document, a computer-usable or computer-readable medium can be any means that can contain, store, communicate, propagate, or transport the program for use by or in connection with the instruction execution system, apparatus, or device. The medium can be, for example, but is not limited to, an electronic, magnetic, optical, electromagnetic, infrared, or semiconductor system, apparatus, device, or propagation medium. More specific examples (a nonexhaustive list) of the computer-readable medium would include an electrical connection having one or more wires, a removable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

In this description, like numbers refer to like elements throughout.

IPsec processing can be used to authenticate or to encrypt the contents of packets for security purposes. Authentication and encryption can both be applied to a packet or either can be applied separately. To simplify this presentation, the description of IPsec processing discusses the encapsulation and decapsulation of the packets in terms of encryption and decryption. The processing described is equally valid if authentication is being applied either alone or in conjunction with encryption.

When IPsec processing is applied to outgoing packets from a source client, the processing encrypts the original source and destination ports and the protocol field and encapsulates this encrypted material into a UDP packet. The original client source IP address is retained in the UDP packet, but the source port number is set to 4500 as prescribed by the RFC 3948 "UDP Encapsulation of IPsec ESP packets". If the UDP packet then passes through a NAPT, the NAPT performs further transformations. These transformations are described in detail below with respect to FIGS. 1 and 2. Specifically, the NAPT substitutes it's own IP address for the client source IP address, assigns a new unique port number to the UDP header and keeps track of these translations so that return packets can be mapped to the original source. RFC 3948 describes a scheme in which the original source port number in a TCP or UDP packet is not changed by the NAPT device, since it is part of the original transport header that is now encrypted as part of the IPsec ESP payload. The port number in the UDP header that is added for UDP encapsulation is changed instead as mentioned above. When such an IPsec packet is received by a server and decrypted, the original source and destination ports of the packet are revealed. For packets that are not processed through IPsec, the NAPT device translates the original source IP address and source port. For unencrypted packets, NAPTs ensure that there are no duplicate connections (duplicate sources).

Figure 2:
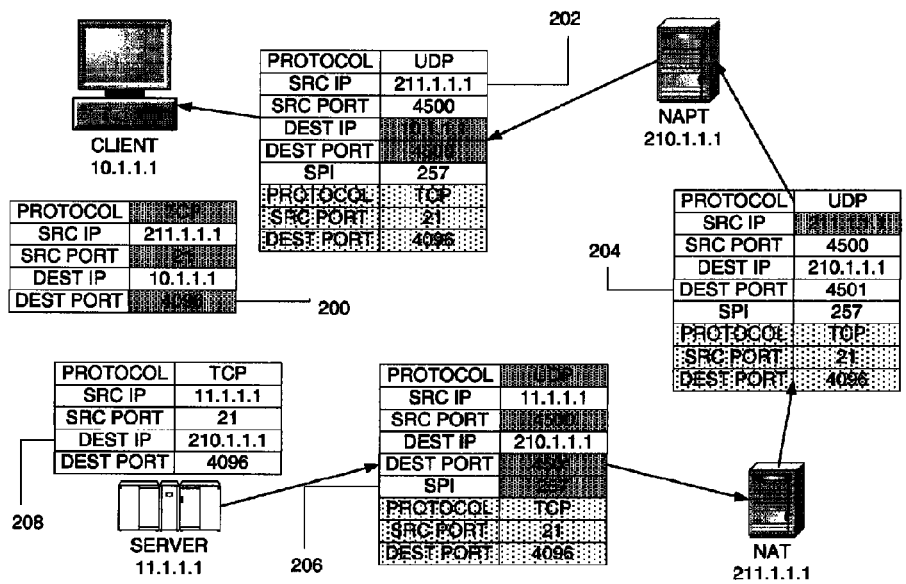
FIG. 2 shows a return packet responsive to the packet of FIG. 1.

FIG. 1 illustrates the transformation of an IPsec packet along a network path as it is sent from client to server. FIG. 2 illustrates the transformation of the return packet in the reverse direction, from server to client. With reference to FIG.

1, the client at IP address 10.1.1.1 sends an encrypted packet destined for the server at IP address 11.1.1.1. The original contents of the packet before processing by IPsec are shown at 100. The left column of 100 describes a field type of the packet, while the right column shows the field contents. Note that the destination IP address at 100 is 211.1.1.1, which is the public address of the NAT in front of the real destination server 11.1.1.1. It is the responsibility of NAT 211.1.1.1 to map packets to its backend servers such as 11.1.1.1. At 100, the source and destination ports are illustratively set to 4096 and 21, respectively. The contents of the packet after IPsec processing are shown at 102. The lightly shaded portion at the bottom of the packet 102 illustrates the portion encrypted by IPsec. The heavier shaded portions of 102 (and the packet contents at other points of the transmission path) illustrate fields that have changed or have been added at that point in the transmission. At 102, the real source and destination ports are encrypted values of 4096 and 21 by IPsec and are not readable at this point. IPsec processing has added a UDP header to indicate that this is an IPsec packet that encapsulates the ports and protocol of the original client packet. The source and destination ports in the clear text UDP header added by IPsec are set to 4500 as required by RFC 3948. An SPI (Security Parameter Index) field is illustratively set to 256. The SPI field, together with a security protocol (ESP or AH) and a destination address, points to a security association between client 10.1.1.1 and server 11.1.1.1 that governs the encryption algorithm and other security parameters between these entities.

The packet at 102 is translated by the NAPT at IP address 210.1.1.1 to result in the packet shown at 104. At this point the NAPT 210.1.1.1 has changed the source IP address to reflect its own address of 210.1.1.1. The NAPT also sets a new unique source port number. In FIG. 1, the selected source port number is illustratively changed from 4500 to 4501. The NAPT 210.1.1.1 keeps track of this translation for return packets from the server 11.1.1.1 and for future outbound packets from client IP 10.1.1.1 and source port 4500.

The packet at 104 is re-translated by NAT 211.1.1.1 into the input packet for server 11.1.1.1. This input packet is shown at 106. Essentially, the destination IP address of the packet is mapped by NAT 211.1.1.1 into the real destination address 11.1.1.1 of the destination server. The IPsec processing of the packet removes the UDP header added by the IPsec processing at the source 10.1.1.1 and restores the real source and destination port numbers. The restored packet, as shown at 108 is then delivered to the destination port (21 in this example) for application processing.

For completeness, FIG. 2 shows a return packet flow from server 211.1.1.1 to the original client 10.1.1.1. There is no need to discuss this packet flow in any detail because the duplicate source problem addressed by the invention cannot occur for return packets.

With reference again to FIG. 1, the packet at 108 contains as a source address the address of the NAPT 210.1.1.1 and source port address 4096. However, it is very possible that another client, say 10.1.1.2, behind NAPT 210.1.1.1 is also sending packets to host 11.1.1.1 from source port 4096. Therefore, because of the presence of an NAPT in the path between client 10.1.1.1 and host 11.1.1.1, there is a possibility of an illegal duplicate source that results in a conflict.

Figure 3:
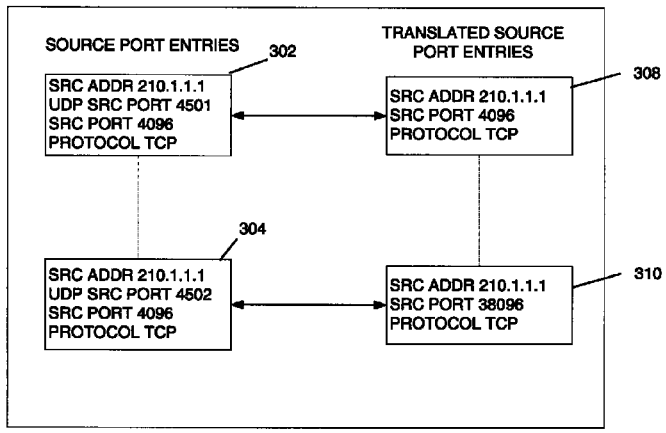
FIG. 3 shows an illustrative embodiment of the Source Port Translation Table (SPTT)

According to the invention, a Source Port Translation Table (SPTT, FIG. 3) at a destination host is used to define associations between sources (called Source Port Entries in FIG. 3), which involve a NAPT, and translated port numbers assigned to such connections by the destination host (called Translated Source Port Entries in FIG. 3). The translated source ports are selected from a pool of ports that are available for assignment (not already assigned) to incoming packets that are associated with a given security association. Each negotiated security association will have its own pool of translation ports. For a given connection, each pool of translation ports must, of course, comply with the same or equivalent security rule in the SPD that the original connection requires, as defined in part by the original client port number. By assigning available translation ports to incoming packets, the number of "duplicate" packets that are rejected by the invention described in application Ser. No. 10/907,661 should be reduced and perhaps dramatically reduced.

An illustrative SPTT is shown in FIG. 3 at 300. This table is built dynamically as needed when incoming packets arrive at the destination host. The Source Port Entries of SPTT contain four fields; 1) the source IP address of the NAPT in the path of the connection (e.g., entry 302 contains NAPT IP address 210.1.1.1); 2) a UDP source port assigned by the NAPT (e.g., 4501 of entry 302); 3) the original source port number selected by the originating client served by the NAPT (e.g. 4096 in entry 302); 4) the protocol of the original client packet (e.g. TCP in entry 302). Each Source Port Entry of the SPTT points to a Translated Source Port Entry. For example, Source Port Entry 302 points to Translated Source Port Entry 308 in FIG. 3. Each Translated Source Port Entry contains three fields; 1) the source IP address of the NAPT in the path of the connection (e.g., entry 308 contains NAPT IP address 210.1.1.1); 2) the translated source port number of the originating client served by the NAPT (e.g. 4096 in entry 302); 3) the protocol selected by an original client packet (e.g. TCP in entry 308). The Source Port Entries are used to find the Translated Source Port Entries for packets inbound to the destination host, while the Translated Source Port Entries are used to find the Source Port Entries for packets outbound from the host.

Figure 13:
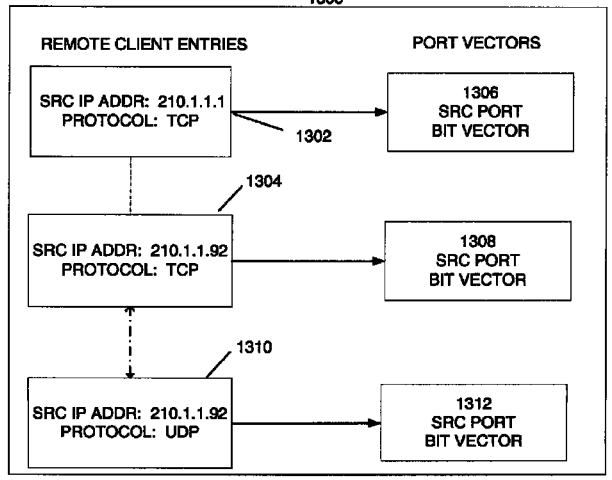
FIG. 13 shows an illustrative embodiment of an Available Source Port pool that keeps track of assigned and unassigned port numbers.

An Available Source Port Pool (ASPP), shown in FIG. 13 (FIG. 13 is on the same sheet as FIG. 3) keeps track of port numbers that are available for translation assignment and those that have already been assigned. The information in ASPP is generated dynamically when a packet is first received at a server from a new remote client. ASPP 1300 contains Remote Client Entries that point to Port Vectors. Each Remote Client Entry contains two fields, an IP address of a NAPT, taken from an incoming packet, and the original client protocol, UDP or TCP, of the packet. The original client protocol is encrypted when the packet arrives, and is available in the clear after IPsec processing at the destination host. Each of these Remote Client Entries points to a different Port Vector, each bit of which describes the available or unavailable state of a port number defined by the position of the bit within the vector.

With reference to FIG. 13, when IKE negotiates an IPsec security association that traverses a NAPT, the TCP/IP stack creates a range of port numbers that are acceptable under the security association that is negotiated. Port numbers within this range can be arbitrarily assigned to incoming packets to avoid the possibility of a duplicate source. How this is done will become clear in the discussion of FIGS. 8 through 12. Only the range of ports that can be assigned according to the security association for the corresponding Remote Client Entry are addressed in any Vector, as will be seen.

FIGS. 4 through 7 help illustrate the above discussion. FIG. 4 shows a packet coming from a source NAPT. The client address and port are assumed to be 10.1.1.1 and 4096 for illustration. 400 is the IP header updated by the NAPT. It contains the NAPT address 210.1.1.1 and a host destination address 11.1.1.1. 402 is the encapsulating UDP header added by IPsec processing and updated by the NAPT. Source port 4500 has been changed to 4501 by the NAPT. 404 contains the Encapsulated Security Protocol (ESP) header added by IPsec processing. The TCP transport header 406 contains the original client source and destination ports, 4096 and 21. 408 contains the payload data followed by the ESP trailer. The transport header 406 and payload 408 are encrypted in accordance with IPsec processing. FIG. 5 represents the packet of FIG. 4 after decryption at the destination. Note now that the source NAPT address 210.1.1.1 (from 500), and the client source port 4096 and protocol (TCP) are now available from 506. For inbound packets, the Source Port Entries (e.g., 302, 304) of SPTT 300 are searched using these attributes to locate a corresponding Translated Source Port Entry, if it exists. For outbound packets, the Translated Source Port Entries (e.g., 308, 310) are searched to locate a corresponding Source Port Entry.

FIGS. 6 and 7 represent a second arriving "duplicate" source packet that will be rejected by the invention of application Ser. No. 10/907,661. This packet will be accepted by the present invention, assuming that there is an available port number for assignment to the packet from the range of allowable port numbers according to the security association that governs the packet.

This process is now explained in more detail below in association with appropriate flowcharts.

FIG. 8 illustrates the initializing of a security association during IKE negotiations. The IKE negotiation is represented at step 802. During the negotiation, step 804 sends a notification to the TCP/IP stack to install the negotiated security association. Once the security association is known, the SPD is searched to determine the range of port numbers, if there is a range, that is available for assignment to connections. Step 806 determines these port numbers and adds them to the security association stored in the stack.

FIG. 9 begins the process of avoiding a duplicate source when a data packet arrives at the destination host. FIG. 9 begins the process of detecting a duplicate source when a data packet arrives at the destination host. Step 902 determines if the incoming packet contains an ESP packet encapsulated in a UDP header, and the source port in the UDP header is not the predefined UDP encapsulation port 4500. If the above is true, then the packet is using IPsec, either for encryption or authentication, and a NAPT is involved in the transmission path. If a packet is using a UDP protocol with a destination port of 4500 and the first four bytes contain non-zero data, then the packet is identified as a UDP encapsulated ESP packet. If the answer to these questions is no, then there are two alternative processing options, option 1 at 904 and option 2 at 906. These are both discussed below. Assuming that the answer to both questions is yes, then step 908 continues at A in FIG. 10. In FIG. 10, step 1001 removes the UDP header from the incoming packet. Step 1002 performs the required IPsec processing to decrypt the packet. As a result, the original client source port number, such as 4096 at 302 and the original client protocol, such as TCP at 302, are obtained. The NAPT source IP address and NAPT assigned port number, such as 210.1.1.1 and 4501, respectively at 302, are known from the UDP header. Step 1004 searches the Source Port Entries of SPTT 300 on these attributes. If a matching Source Port Entry is found at step 1006, this means that a translated port number has already been assigned to this session. Step 1008 locates the port number that has been assigned. In this example, the matching Source Port Entry is 302. The corresponding Translated Source Port Entry is 308. Entry 308 contains the assigned source port number 4096, which happens to be identical to the original client source port number. This means is that when entry 308 was created, the original client source port number was available for assignment and was therefore used as the assigned port. This will be covered further below. Step 1010 replaces the source port number in the packet transport header with the translated source port from 308 and normal packet processing continues at 1012. Had the matching Translated Source Port Entry been 310 at step 1008, then the translated port number would have been 38096 according to the illustrative contents of SPTT 300.

Continuing with this example, if a Source Port Entry in SPTT 300 is not found at step 1006, then a process begins to create such an entry and the entries of the ASPP 1300 as needed. Initially, step 1016 determines if an ASPP Remote Client Entry already exists. If not, step 1020 creates the entry using the source NAPT IP address 210.1.1.1 in this example and the Protocol TCP from the decrypted packet. Step 1022 creates the corresponding Bit Vector. Initially, all bits of the Vector are set to the available state. At E of FIG. 11, step 1102 next determines if the client source port number in the packet is marked as available in the Source Port Bit Vector. If it is, the source port number in the packet is assigned at 1104. This corresponds to the example at 302 and 308, where the original source port number and the assigned port number are identical. If the original client source port number is marked unavailable in the Vector, step 1110 determines the range of ports that are allowable for assignment according to the security association. Within this range in the Port Bit Vector, step 1112 determines the next port number that is available, if any. If no port numbers are available for assignment, the packet is rejected at 1114, because it represents a duplicate source that cannot be resolved. If a port is available within the allowable range in the Vector, step 1113 creates a translated source port entry, such as 308 and 310) in SPTT 300 using a selected available port from the Vector; step 1106 marks the selected port as unavailable; step 1108 creates a Source Port Entry, such as 304, in SPTT 300 and associates it with the translated source port entry created at step 1113. Processing continues at F in FIG. 10 where the packet port number is replaced with the assigned port number at step 1010 and normal packet processing continues at step 1012.

One variation to the above at step 1110 is required if option 1 from FIG. 9 is used. In the event that step 910 determines that an incoming packet is not an IPsec packet, then there is no SA associated with this packet. Therefore, step 1110 must obtain the port bit vector containing the range of ports available for assignment directly from the SPD rather than from a SA as in the preferred embodiment.

Options 1 and 2 from FIG. 9 represent situations in which packets are sent in the clear (no IPsec processing) or there is no address translation (NAPT) in the path. As long as some security association ends on this host that also traverse a NAPT, duplicate sources are still possible in these situations. Both alternative options 1 and 2 avoid such duplicate packets in these conditions. Option 1 applies the same principles as discussed above for duplicate source avoidance, but by applying or avoiding IPsec processing as required by the packet. Option 2 uses the filtering rules of the SPD to avoid duplicate sources. If option 1 (904) is selected, step 910 determines if the packet requires IPsec processing. If yes, processing continues at 912, which continues to B in FIG. 10; step 1002 at B in FIG. 10 performs IPsec processing as required and processing continues on at 1004. If the packet is not an IPsec packet at step 910, step 914 continues to D in FIG. 10, which merely skips the IPsec processing step at B. In this situation, step 1004 in FIG. 10 uses a UDP source port of zero (0), since there is no encapsulating UDP header in the packet.

Option 2 uses inbound IPsec packet filtering to avoid duplicate sources, if possible. Once IPsec is in place, all packets are processed through the IPsec rules table SPD, whether any packet is encrypted or not. This is to verify that clear packets on a given connection are in fact allowed by the IPsec rules. The option 2 process begins at C of FIG. 12. The incoming packet is processed through the IPsec rule table (not shown) at step 1202. An example of how this is done in a preferred embodiment can be determined from the aforementioned U.S. Pat. No. 6,347,376. This patent is incorporated by reference in its entirety. If the packet is encrypted (step 1204), then step 1206 determines if the matching IPsec rule requires encryption. Assuming that is the case, the packet is allowed at 1206. Otherwise, it is rejected at 1210. If the packet is in the clear at step 1204, then a determination is made at 1212 if the matching IPsec rule allows unencrypted packets and the packet is allowed or rejected accordingly.

In tunnel mode, the IPsec SA is not necessarily end-to-end. For example, an SA might be negotiated between a host and a gateway that serves multiple clients or servers. In tunnel mode a single NAPT address (which is the source IP address in the UDP encapsulating header) could potentially represent multiple hosts. In tunnel mode, the encapsulated, encrypted portion of a packet contains both the original IP address of the source and the TCP transport header. For the purpose of this specification, the original IP address of the source in tunnel mode is called the inner source IP address. Because the inner source IP address is not globally unique, it is not usable for packet routing or for representing the source of a connection. The original source port, such as contained in the source port entries of SPTT 300, and the encapsulating source IP address with the UDP port alone, as described above for transport mode, might not be unique. To solve this, an additional field that contains the inner source IP address is added to the source port entries (e.g., 302 and 304) of the SPTT 300 in FIG. 3. The inner source IP address (not available in transport mode) when combined with the other values of the source port entries yield a unique identifier for hosts protected by a tunnel mode IPsec SA.

Artisans in the field of this invention will quickly realize that the preferred and disclosed embodiment can have many minor variations that are within the intent and scope of the teaching. It is the intent of the inventor to encompass these variations to the extent possible in accordance with the state of the applicable relevant art in the field of the invention.

What is claimed is:

1. A method of preventing duplicate source port numbers in a network that uses network address port translation (NAPT) on an established connection between a source host computer and a destination host computer, the method performed at the destination host computer and comprising:

receiving an inbound packet on the connection;
   processing the received packet to obtain therefrom input values from the packet, the input values comprising a network source address, a source port number added to the packet by the NAPT, an original source port number of the source host computer, and a protocol identification;
   consulting a mapping of source port numbers to translated source port numbers, using the input values; and
   responsive to finding no matching entry in the consulted mapping, performing a translation to prevent the duplicate source port numbers, comprising:
      determining if a port number is available within a range of port numbers that comply with a security association governing the connection;
      responsive to the determining locating an available port number, assigning the located available port number as a translated source port number for the connection, marking the located available port number as no longer available, adding a new entry to the mapping to thereby associate the input values with the translated source port number for the connection, and modifying the packet to replace the obtained original source port number with the translated source port number; and
      responsive to the determining failing to locate the available port number, rejecting the packet as not being translatable to prevent the duplicate source port numbers.

2. The method according to claim 1, wherein the obtained network source address is an Internet Protocol address of the NAPT.

3. The method according to claim 1, wherein the source port number added by the NAPT indicates that the packet has passed through the NAPT on the connection.

4. The method according to claim 1, wherein the connection operates in a transport mode.

5. The method according to claim 1, wherein:
   the connection operates in a tunnel mode; and
   the input values obtained by the processing further comprise an original network source address of the source host computer.

6. A system for preventing duplicate source port numbers in a network that uses network address port translation (NAPT) on an established connection between a source host computer and a destination host computer, the system comprising:

a destination host computer comprising a processor; and
   instructions which are stored in a storage medium communicatively coupled to the processor and which are operable, using the processor, to perform functions comprising:
      receiving an inbound packet on the connection;
      processing the received packet to obtain therefrom input values from the packet, the input values comprising a network source address, a source port number added to the packet by the NAPT, an original source port number of the source host computer, and a protocol identification;
      consulting a mapping of source port numbers to translated source port numbers, using the input values; and
      responsive to finding no matching entry in the consulted mapping, performing a translation to prevent the duplicate source port numbers, comprising:
         determining if a port number is available within a range of port numbers that comply with a security association governing the connection;
         responsive to the determining locating an available port number, assigning the located available port number as a translated source port number for the connection, marking the located available port number as no longer available, adding a new entry to the mapping to thereby associate the input values with the translated source port number for the connection, and modifying the packet to replace the obtained original source port number with the translated source port number; and
         responsive to the determining failing to locate the available port number, rejecting the packet as not being translatable to prevent the duplicate source port numbers.

7. The system according to claim 6, wherein the obtained network source address is an Internet Protocol address of the NAPT.

8. The system according to claim 6, wherein the source port number added by the NAPT indicates that the packet has passed through the NAPT on the connection.

9. The system according to claim 6, wherein the connection operates in a transport mode.

10. The system according to claim 6, wherein:
   the connection operates in a tunnel mode; and
   the input values obtained by the processing further comprise an original network source address of the source host computer.

11. A computer program product for preventing duplicate source port numbers in a network that uses network address port translation (NAPT) on an established connection between a source host computer and a destination host computer, the computer program product comprising a non-transitory computer-readable storage medium having program instructions embodied therewith, the program instructions executable by the destination host computer to cause the destination host computer to:
   receive an inbound packet on the connection;
   process the received packet to obtain therefrom input values from the packet, the input values comprising a network source address, a source port number added to the packet by the NAPT, an original source port number of the source host computer, and a protocol identification;
   consult a mapping of source port numbers to translated source port numbers, using the input values; and
   responsive to finding no matching entry in the consulted mapping, perform a translation to prevent the duplicate source port numbers, comprising:
      determining if a port number is available within a range of port numbers that comply with a security association governing the connection;
      responsive to the determining locating an available port number, assigning the located available port number as a translated source port number for the connection, marking the located available port number as no longer available, adding a new entry to the mapping to thereby associate the input values with the translated source port number for the connection, and modifying the packet to replace the obtained original source port number with the translated source port number; and
      responsive to the determining failing to locate the available port number, rejecting the packet as not being translatable to prevent the duplicate source port numbers.

12. The computer program product according to claim 11 wherein the obtained network source address is an Internet Protocol address of the NAPT.

13. The computer program product according to claim 11, wherein the source port number added by the NAPT indicates that the packet has passed through the NAPT on the connection.

14. The computer program product according to claim 11, wherein the connection operates in a transport mode.

15. The computer program product according to claim 11, wherein:
   the connection operates in a tunnel mode; and
   the input values obtained by the processing further comprise an original network source address of the source host computer.

\* \* \* \* \*